(12) United States Patent
Zhou et al.

(10) Patent No.: US 9,336,035 B2
(45) Date of Patent: May 10, 2016

(54) METHOD AND SYSTEM FOR VM-GRANULAR I/O CACHING

(71) Applicant: VMware, Inc., Palo Alto, CA (US)

(72) Inventors: Li Zhou, Palo Alto, CA (US); Samdeep Nayak, Sunnyvale, CA (US); Sandeep Uttamchandani, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 411 days.

(21) Appl. No.: 13/658,567

(22) Filed: Oct. 23, 2012

(65) Prior Publication Data

US 2014/0115228 A1    Apr. 24, 2014

(51) Int. Cl.
   *G06F 9/455* (2006.01)
   *G06F 12/02* (2006.01)

(52) U.S. Cl.
   CPC ........ *G06F 9/45558* (2013.01); *G06F 9/45533* (2013.01); *G06F 12/0246* (2013.01); *G06F 2009/45579* (2013.01); *G06F 2212/222* (2013.01); *G06F 2212/7202* (2013.01); *G06F 2212/7207* (2013.01)

(58) Field of Classification Search
   None
   See application file for complete search history.

(56) References Cited

U.S. PATENT DOCUMENTS

| | | | | |
|---|---|---|---|---|
| 6,075,938 | A * | 6/2000 | Bugnion et al. | 703/27 |
| 8,261,267 | B2 * | 9/2012 | Iwamatsu et al. | 718/1 |
| 2002/0129274 | A1 | 9/2002 | Baskey et al. | |
| 2003/0037089 | A1 * | 2/2003 | Cota-Robles et al. | 709/1 |
| 2007/0005934 | A1 | 1/2007 | Rotithor et al. | |
| 2007/0156845 | A1 | 7/2007 | Devanneaux et al. | |
| 2008/0098194 | A1 * | 4/2008 | Hashimoto et al. | 711/173 |
| 2010/0229168 | A1 * | 9/2010 | Maeda et al. | 718/1 |
| 2010/0235836 | A1 * | 9/2010 | Bratanov | 718/1 |
| 2011/0202728 | A1 * | 8/2011 | Nichols et al. | 711/141 |
| 2011/0307889 | A1 | 12/2011 | Moriki et al. | |
| 2012/0030406 | A1 * | 2/2012 | Chang et al. | 711/6 |
| 2012/0047516 | A1 * | 2/2012 | Barwick | 718/108 |
| 2012/0180043 | A1 | 7/2012 | Tsirkin et al. | |
| 2012/0210068 | A1 * | 8/2012 | Joshi et al. | 711/122 |
| 2013/0104125 | A1 | 4/2013 | Sarma et al. | |
| 2013/0132674 | A1 | 5/2013 | Sundrani | |
| 2014/0052892 | A1 | 2/2014 | Klein et al. | |
| 2014/0080479 | A1 | 3/2014 | Vangala et al. | |
| 2014/0297780 | A1 | 10/2014 | Zhou et al. | |

OTHER PUBLICATIONS

Luo et.al. "S-CAVE: Effective SSD Caching to Improve Virtual Machine Storage Performance" 2013.*
Luo et al, "S-CAVE: Effective SSD Caching to Improve Virtual Machine Storage Performance," Proceedings of the 22nd International Conference on Parallel Architectures and Compilation Techniques, PaCT'2013, 2013, pp. 103-112, IEEE, USA.

* cited by examiner

*Primary Examiner* — Yaima Rigol
*Assistant Examiner* — Tasnima Matin (57) ABSTRACT

Methods are presented for caching I/O data in a solid state drive (SSD) locally attached to a host computer supporting the running of a virtual machine (VM). Portions of the SSD are allocated as cache storage for VMs running on the host computer. A mapping relationship is maintained between unique identifiers for VMs running on the host computer and one or more process identifiers (PIDs) associated with processes running in the host computer that correspond to each of the VM's execution on the host computer. When an I/O request is received, a PID associated with I/O request is determined and a unique identifier for the VM is extracted from the mapping relationship based on the determined PID. A portion of the SSD corresponding to the unique identifier of the VM that is used as a cache for the VM can then be accessed in order to handle the I/O request.

21 Claims, 6 Drawing Sheets

METHOD AND SYSTEM FOR VM-GRANULAR I/O CACHING

BACKGROUND

Flash memory is a non-volatile storage chip that is electrically erasable and programmable. Negated AND (NAND) type flash memories exist in a wide range of portable storage devices, such as memory cards and USB drives. In recent years, the cost of NAND flash has dropped enough to make solid state drives (SSD) a viable option as primary storage devices for computer systems, often as a replacement for conventional hard disks.

Compared with traditional hard disks, flash/SSD devices (hereinafter, also generally referred to as an "SSD" device) have superior I/O performance. In addition, the cost of SSD devices has been continuously decreasing. These two factors make it increasingly popular to use SSD devices as a "second-level" cache which resides between the main memory (e.g., RAM) and a primary persistent storage such as a hard disk (as opposed to "first-level" or buffer cache which needs to utilize a portion of the main memory). Such a "second level" cache can be used by an operating system to cache "hot" I/O blocks (e.g., I/O blocks that may be frequently accessed) to improve I/O latency and throughput. Typically, such second-level caching involves a filter driver in the OS kernel I/O stack, which can intercept all I/Os, identify hot blocks, and dispatch I/Os to a cache or persistent storage.

In a virtualized environment, however, using a SSD device as a second-level cache brings up new challenges. For example, because a host computer system (e.g., a "host") supports the running of multiple virtual machines (VMs) in a virtualization environment, the host computer system would need to manage the second-level cache on a per-VM basis and maintain VM-specific caching policies. One way to facilitate such "VM-granular" second-level caching might be to implement the second-level caching in the guest operating system (OS) that runs within a VM. However, implementing a second level cache within a guest OS may require significant modifications or additions to both (i) the virtualization layer of the host computer system that supports VMs (also known as a hypervisor), in order to expose at least a portion of the SSD device as a "virtual storage device" to the guest OS of VMs, and (ii) the guest OS (or applications running on top of the guest OS) within the VM, so that such guest OS or application is programmed or otherwise configured to actually utilize such a virtual storage device as a second level cache. Furthermore, dynamically sharing the SSD device in a host computer system among multiple VMs is also difficult.

SUMMARY

Methods are presented for caching I/O data in a solid state drive (SSD) locally attached to a host computer supporting the running of a virtual machine (VM). Portions of the SSD are allocated as cache storage for VMs running on the host computer. A mapping relationship is maintained between unique identifiers for VMs running on the host computer and one or more process identifiers (PIDs) associated with processes running in the host computer that correspond to each of the VM's execution on the host computer. When an I/O request is received, a PID associated with I/O request is determined and a unique identifier for the VM is extracted from the mapping relationship based on the determined PID. A portion of the SSD corresponding to the unique identifier of the VM that is used as a cache for the VM can then be accessed in order to handle the I/O request.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Certain embodiments described herein provide VM-granular "second-level" I/O caching using a local SSD device in a host by mapping a unique identifier for a VM to process IDs corresponding to processes running on behalf of the VM that may perform I/O, and embedding a cache module into an I/O stack of the hypervisor of the host to manage at least a portion of the SSD device as a cache for the VM. In one embodiment, when an I/O read or write request reaches the cache module, the cache module identifies which VM the I/O request belongs to based by matching the process ID relating to the I/O request to the VM's unique identifier, which is used to track data blocks for the VM that are cached in the local SSD drive. The cache module can then perform VM-granular caching for the I/O request. In addition, a management agent service, daemon or process running in "user world" on the host (e.g., a process running on top of a kernel of the hypervisor) can obtain VM-specific caching policies from a centralized caching policy manager, for example, running on a computer system separate from the host, in order to, for example, a allocate an appropriate amount of space in the local SSD device to allocate to a VM for caching purposes.

System Architecture

As mentioned above, facilitating "second-level" caching in a virtualized environment presents a number of challenges. First, a number of VMs running on the same host may need to share a SSD device in the host that is configured for use as a second-level cache. Second, the ability to "migrate" VMs across different hosts can result in a migrated VM losing access to its cached data in the SSD device that was installed in its prior host. In addition, since VMs can run a number of different types of guest OSs, modifications to a guest OS to support use of the SSD device in a host as a cache for a VM is undesirable.

Figure 1:
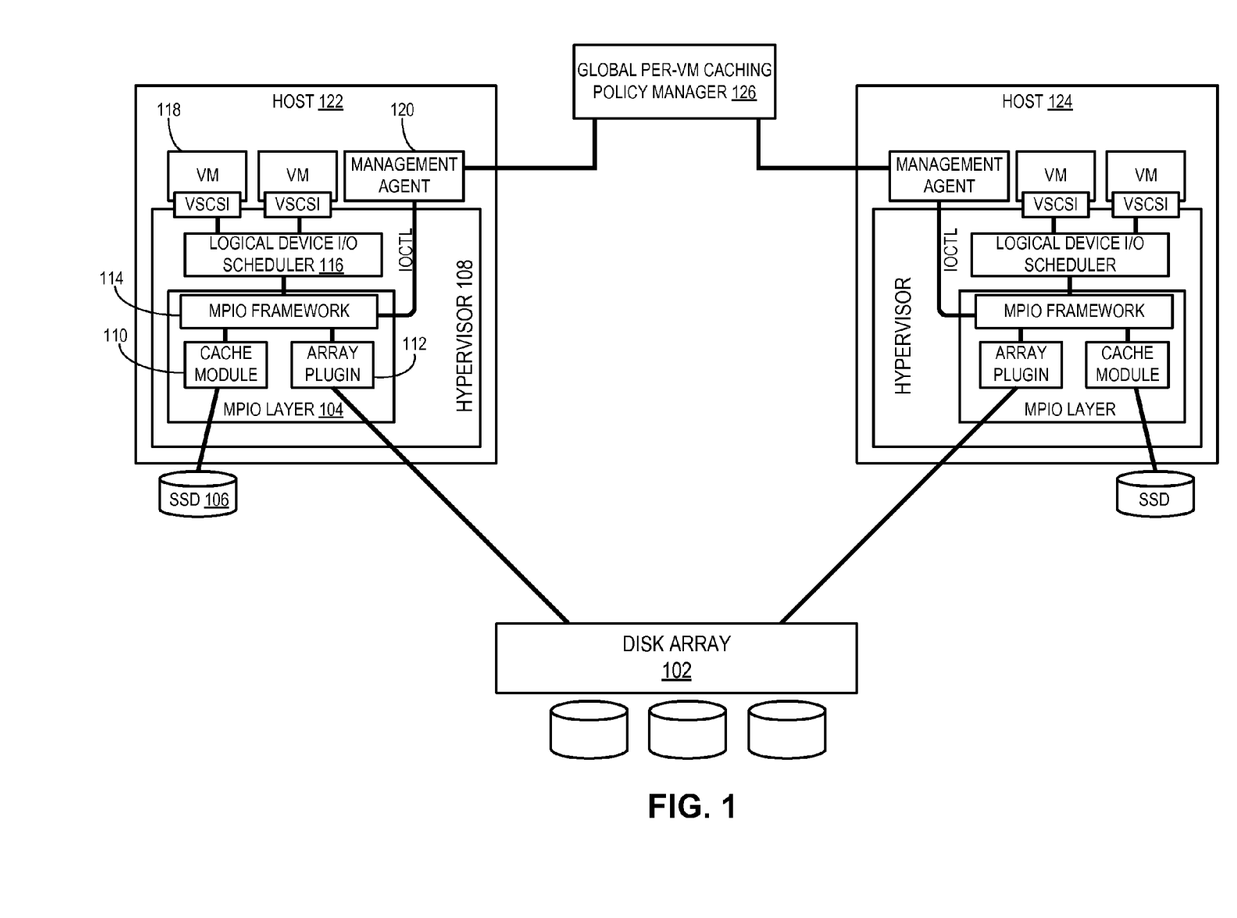
FIG. 1 illustrates an exemplary system architecture of a virtualized data center which supports VM-granular second-level I/O caching, in accordance with one embodiment.

FIG. 1 illustrates a system architecture of a virtualized data center which supports VM-granular second-level I/O caching, in accordance with one embodiment. The system architecture of FIG. 1 introduces at least three components to the virtualized data center: (i) a global caching policy manager 126, which, for example, may be functionality that is embedded (e.g., as a "plug-in") into a more general VM data center management platform, such as vCenter Server from VMware, Inc. ("VMware"), (ii) a cache module 110 that is embedded into an I/O stack of a hypervisor 108 of each host 122 and 124, serves as a communication channel with an SSD device 106 (or SSD devices) installed in each of hosts 122 and 124, respectively, and manages SSD device 106 as a "transparent" cache for VMs (e.g., unknown to the VMs themselves) running on the hosts, and (iii) a management agent 120 running (e.g., running in "user world," as discussed above) on each of hosts 122 and 124 that serves as a communication intermediary between global caching policy manager 126 and cache module 110.

Global caching policy manager 126 maintains VM-specific caching policies such that the policies are accessible to a number of hosts in a data center or managed cluster (e.g., such as the 2 host cluster comprising hosts 122 and 124). For example, embodiments of global caching policy manager 126 can provide a user interface for an IT administrator to globally enable or disable SSD caching on any host on a per-VM basis and specify SSD cache space that is required by a VM. By maintaining a VM's caching policy in global caching policy manager 126, such a VM can be migrated (e.g., via live migration technologies in certain embodiments, such as VMware's vMotion migration technology) from one host to another host while ensuring that the host to which the VM will be migrated can comply with the VM's caching policy once it is migrated. For example, hypervisor 108 on host 122 may be requested (e.g., by a VM data center management platform such as vCenter Server) to run a VM 118, upon which, management agent 120 on host 122 may receive a notification from hypervisor 108 (e.g., by registering with hypervisor 108 to request notification of certain VM related events, such as VM startup, migration, shutdown and the like) of the intention to start VM 118, and accordingly communicates with global policy manager 126 to obtain the caching policy for VM 118 to confirm whether host 122 can comply with the caching policy of VM 118. The caching policy of VM 118 may, for example, specify that a certain amount of storage in SSD 106 of host 122 be allocated as a cache for VM 118 and management agent 120 may communicate such a caching policy to cache module 110 to determine whether SSD 106 of host 122 can support such a cache requirement. In one embodiment, the communication channel between management agent 120 and cache module 110 may be implemented as I/O control ("IOCTL") system calls by management agent 120 into hypervisor 108. If cache module 110 determines that SSD device 106 of host 122 can support the caching policy of VM 118, then cache module 110 may allocate a portion of SSD device 106 to be used as a cache for VM 118 when VM 118, for example, performs I/O in order to read or write data to a virtual disk file that resides in a shared disk array 102. Similar to allocating space in SSD device 106 to startup VM 118 on host 122, cache module 110 also deallocates or otherwise invalidates "stale" cache or space in SSD device 106, for example, when a VM is shutdown or migrated to a different host (or for any other cache management purposes, such as cache time-outs, full cache space, and the like). In one embodiment, when a VM data center management platform such as vCenter Server instructs hypervisor 108 to shutdown VM 118 or migrate VM 118 to host 124, hypervisor 108 transmits a corresponding notification to management agent 120, which, in turn, communicates with cache module 110 (via IOCTL) to invalidate or deallocate that portion of SSD device 106 which had been allocated to VM 118. In an alternative embodiment, global caching policy manager, as part of a VM data center management platform such as vCenter Server, may directly communicate an intention to shutdown or migrate VM 118 to management agent 120 in host 122, which, in turn communicates the intention to cache module 110.

In addition to allocating and invalidating cache space in SSD device 106, cache module 110 also facilitates the per-VM caching of data in SSD device 106 when VMs are performing I/O. In certain embodiments that utilize a system architecture similar to that of FIG. 1, cache module 110 is implemented within a multi-pathing (MPIO) layer 104 of hypervisor 108. As depicted in FIG. 1, MPIO layer 104 sits within an I/O stack of hypervisor 108 that includes (i) a virtual SCSI (vSCSI) layer that, for example, presents to the guest OS of VM 118 a virtual disk file stored in a file system in disk array 102 as a logical storage device (e.g., SCSI block device), and (ii) a logical device I/O scheduler 116 that schedules block I/O to the logical storage devices for the VMs running in a hypervisor and, for example, enforces the fair sharing of logical storage devices between VMs.

MPIO layer 104 receives block I/Os from logical device I/O scheduler 116 and, to increase fault tolerance and enhance I/O performance, appropriately selects one of a multiple of paths (e.g., one port of a number of available ports in a number of host bus adapters in host 122 that can route I/O to disk array 102, etc.) from host 122 to disk array 102 to route I/O. The particular embodiment of MPIO layer 104 of FIG. 1 further implements an MPIO framework 114 that enables third party disk array vendors (e.g., such as the third party vendor of disk array 102) to provide "plug-in" modules, such as array plugin 112, that can be dynamically loaded into MPIO layer 104 in order to dispatch I/Os received by MPIO framework 115 to, for example, disk array 102 along a selected path and in accordance proprietary policies and techniques of the vendor. In such an embodiment, cache module 110 can also be inserted as a "plug-in" supported by MPIO framework 114. However, as further discussed below, cache module 110 selectively routes block I/Os received from MPIO framework 115 to SSD 106 instead of disk array 102, utilize SSD 106 as a local "second level" cache. It should be recognized, however, that alternative embodiments to FIG. 1 may not embed cache module 110 in a MPIO layer 104 or use a MPIO framework 114 as described above. For example, alternative embodiments may insert cache module 110 into any other layer or component of an I/O stack of hypervisor 108 that would enable cache module 110 to receive I/Os prior to transmitting such I/Os to disk array 102 in order to assess whether a cache in SSD device 106 should be accessed.

As previously described, embodiments of cache module 110 manage SSD device 106 as a cache to VMs running on host 122 on a "per VM" basis. In order to perform caching of I/O on a per-VM basis, cache module 110 should be able to associate block I/O requests that it receives from the I/O stack of hypervisor 108 with the particular VMs that are performing such I/O requests. In one embodiment, cache module 110 obtains a unique identifier for VM 118 from management agent 120 which, for example, receives the unique identifier of the VM upon receipt of a VM startup notification, as previously discussed. In certain of such embodiments, such a unique identifier may be a "universally unique identifier" (UUID) that, for example, is based on an identifier of the physical host in which a VM has been instantiated and a pathname of the location of the VM's configuration file (e.g. a .vmx file in certain VMware technology based embodiments) that is stored in shared disk array 102. Cache module 110 may associate a VM's allocated cache space in SSD device 106 with this unique identifier.

Management agent 120 may be further configured to request and receive from hypervisor 108 (e.g., upon receiving a VM start notification, etc.) the identifiers or IDs of all processes associated with a VM running on hypervisor 108. For example, in certain embodiments, such as embodiments using VMware's vSphere Hypervisor as hypervisor 108, hypervisor 108 spawns a separate process or thread for each virtual CPU (vCPU) of a running VM—the process ID (PID) of each such vCPU process is sometimes referred to as a "vCPU ID" or "world ID." In one embodiment, such as an embodiment using VMware's vSphere virtualization technologies, management agent 120 is able to obtain the vCPU IDs corresponding to a VM through an API provided by hypervisor 108 (e.g., in vSphere, referred to as the VMkernel Sysinfo Interface or VSI) and forward the vCPU IDs to cache module 110 in association with the VM's unique identifier. Cache module 110 then maintains a mapping between the unique identifier of the VM (which also identifies the area of SSD device 106) which serves as a cache for such VM and the PIDs or vCPU IDs of the vCPU processes running in the VM. When a VM transmits an I/O read or write request, the PID or vCPU ID of the VM's vCPU that is requesting the I/O is also passed through the various layers of the I/O stack of hypervisor 108, along with the I/O request itself, such that an I/O response can be ultimately be returned to the requesting PID or vCPU ID. As such, when the I/O request reaches cache module 110, which is embedded in the I/O stack of hypervisor 108, cache module 110 is able obtain the PID or vCPU ID associated with the I/O request and map it to the unique identifier of the VM. In doing so, cache module 110 is thus able to access the cache in SSD device 106 that is associated with the unique identify of the VM to see if the I/O request can be handled by the cache.

Figure 2:
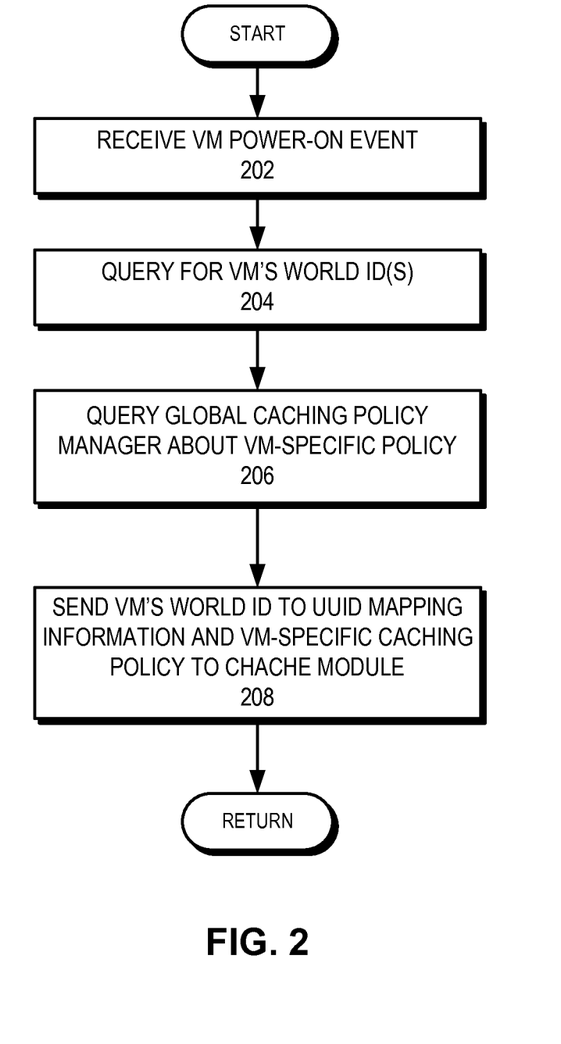
FIG. 2 presents a flowchart illustrating the process of mapping a VM's unique identifier to the VM's corresponding process IDs, in accordance with one embodiment.

FIG. 2 presents the foregoing discussion in a generalized flowchart. As previously discussed and depicted in operation 202, management agent 120 receives a start-up, power-on or resume (e.g., after a migration) notification from hypervisor 108 on host 122 when a VM data center management platform (e.g., vCenter Server) requests hypervisor 108 to start or resume VM 118. The start-up notification includes the VM's unique identifier (UUID) which management agent 120 then provides to hypervisor 108 to obtain the vCPU or world IDs of the running vCPU processes for VM 118 (operation 204). Management agent further 120 provides the unique identifier of VM 118 to global caching policy manager 126 to obtain VM 118's caching policy, or an update to VM 118's caching policy (operation 206). Management agent 120 is thus able to transmits VM 118's world ID-to-UUID mapping information and caching policy information to cache module 110 (operation 208).

Figure 3:
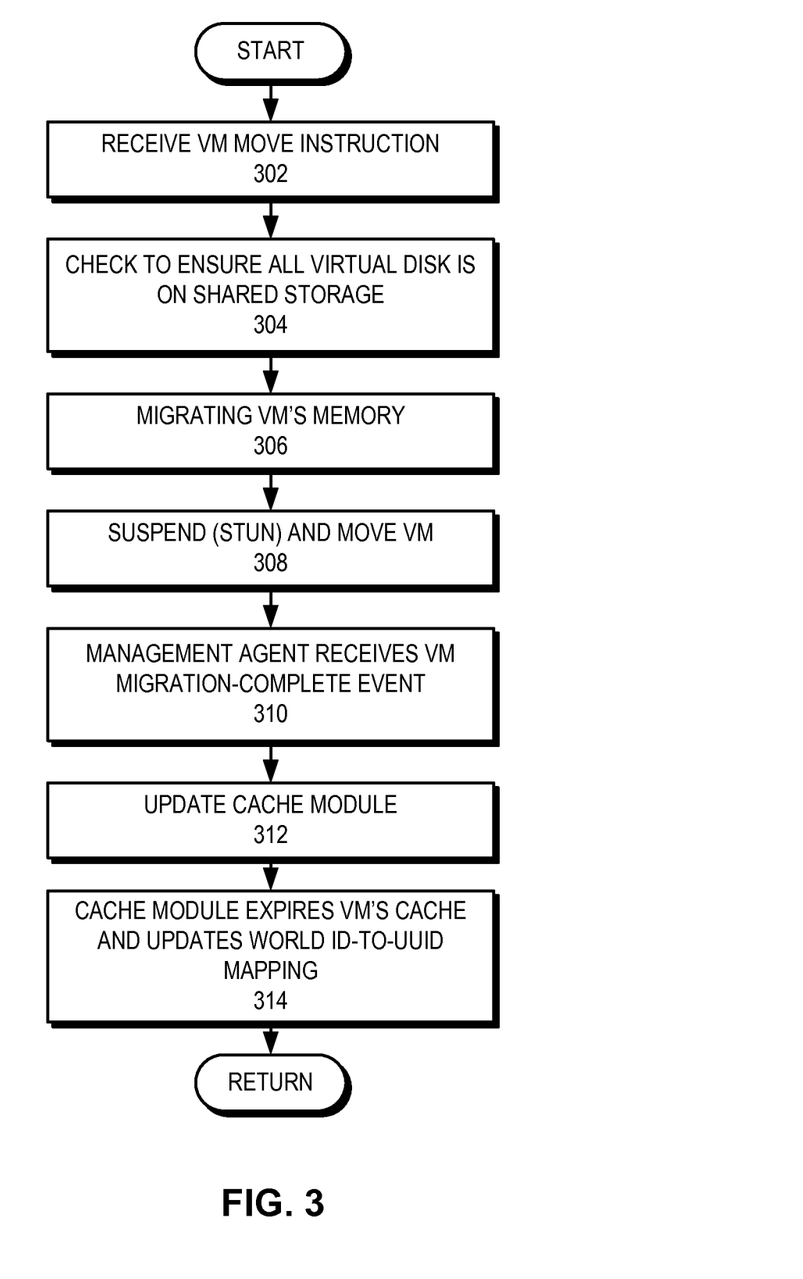
FIG. 3 presents a flowchart illustrating the process of invalidating a VM's second-level cache in an SSD device while migrating a VM, in accordance with one embodiment.

FIG. 3 presents a flowchart illustrating the process of invalidating a VM's second-level cache in an SSD device while migrating a VM, in accordance with one embodiment. In operation 302, hypervisor 108 receives an instruction (e.g., from vCenter Server) to migrate VM 118 from host 122 to host 124. In operation 304, hypervisor 108 checks to ensure that all virtual disk files of the VM 118 reside on shared disk array 102, so that host 124 can also access the virtual disk files of VM 118 on shared disk array 102 one VM 118 is migrated to host 124. Subsequently, in operation 306, hypervisor 108 begins a process of copying VM 118's memory (and device state) to the host 124. Once a sufficient amount of memory has been copied to host 124, hypervisor 108 then suspends or "stuns" VM 118, copies any remaining memory of VM 118 to host 124 and completes the migration of VM 118 to the target host in operation 308. In operation 310, management agent 120 is notified by hypervisor 108 of the completion of the migration and, in turn, management agent 120 instructs cache module 110 to invalidate any portion of SSD device 106 in host 122 that was allocated as a cache to VM 118 in operation 312. Cache module 110 thus accordingly expires all the cached data for VM 118 in SSD device 106 and updates its correspondingly updates its VM world ID-to-UUID mapping information in operation 314 (e.g., by removing any mappings for the unique identifier of VM 118).

I/O Process

As part of the I/O stack in hypervisor 108, cache module 110 receives read and write I/O requests originating from VM 118 (e.g., via MPIO framework 114 in the embodiment of FIG. 1) and maintains a table or other data structure indicating the data blocks that are cached in SSD device 106. For example, in one embodiment, cache module 100 may have multiple tables or sub-tables of the data blocks that correspond to each VM's unique identifier (UUID) and that map such data blocks to physical locations in SSD device 106. In certain embodiments, in response to write I/O requests, cache module 110 may utilize SSD device 106 as a "write-through" cache, such that data is simultaneously written to both SSD device 106 and a virtual disk file in disk array 102. Alternative embodiments may utilize SSD device 106 as "write-back" or "write-behind" cache, where data is initially written only to SSD device 106. In response to a read I/O request, if the table maintained by cache module 110 indicates that the data relating to the I/O request has been cached in SSD device 106 (e.g., a "cache hit"), cache module 110 fetches data from the SSD device 106, and returns the data up the I/O stack of hypervisor 108 (e.g., back to MPIO framework 114 in the embodiment of FIG. 1). If SSD device 106 does not contain the requests data, cache module 110 forwards the read I/O request to array plugin 112, which in turn fetches the data from disk array 102 (e.g., from the virtual disk file of VM 118). When array plugin 112 receives the data from disk array 102, it forwards the data to cache module 110, which writes the data to SSD device 106 in preparation for future read I/O requests. Similarly, in response to a write I/O request, cache module 110 passes the write I/O request to array plugin 112, and also writes the data blocks to SSD device 106 to invalidate existing "dirty" blocks in the cache that related to those data blocks.

Figure 4:
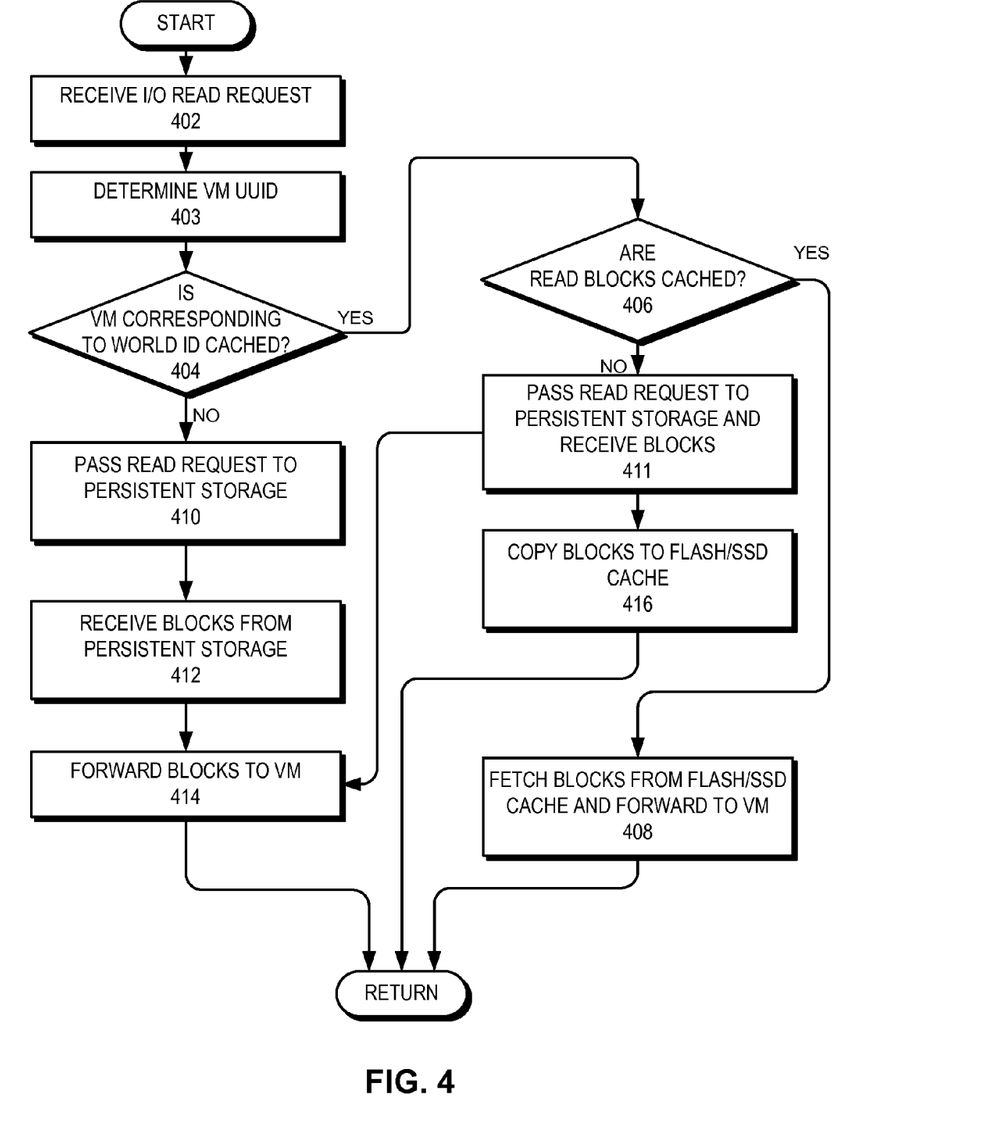
FIG. 4 presents a flowchart illustrating the process of processing a read I/O request in a host that supports VM-specific second-level caching, in accordance with one embodiment.

FIG. 4 presents a flowchart further illustrating the process of processing a read I/O request in a host that supports VM-specific second-level caching, in accordance with one embodiment. As previously discussed, during operation, cache module 110 receives a read I/O request (operation 402) from the I/O stack of hypervisor 108. In certain embodiments that utilize MPIO framework 114, for example, cache module 110 may receive the read I/O request from MPIO framework 114. Cache module 110 is able to determine the process ID that is associated with the read I/O request. As previously discussed, such a process ID or PID in certain embodiments may correspond to a vCPU ID or world ID of a particular vCPU process running on behalf of the VM that is handling the I/O read for the VM. It should be recognized that the process ID of an I/O request may be extracted from data structures or data frames that accompany an I/O request through various layers of any I/O stack, such as the I/O stack of hypervisor 108. Once cache module 110 identifies the process ID (e.g., world ID) handling the read I/O request, cache module 110 is able to map the process ID to the VM's unique identifier (UUID), as previously discussed.

If the VM corresponding to the UUID has second-level caching enabled (as indicated by the VM's caching policy) (operation 404), cache module 110 checks whether the data blocks corresponding to the read I/O request are cached in SSD 106 (operation 406). For example, in one embodiment as previously discussed, cache module 110 may check a table with entries corresponding to the VM's UIUD to see if such data blocks are cached for the VM's particular UUID. If the data blocks are cached, cache module 110 fetches the data blocks from SSD 106 device and forwards them back up the I/O stack of the hypervisor to the VM (operation 408). If the blocks are not cached, cache module 110 passes the read I/O request to array plugin 112 (or further down the I/O stack of the hypervisor in other embodiments that do not use array plugin 112), which in turn forwards the request to shared disk array 102 and subsequently receives the data blocks from shared disk array 102 (operation 411) and forwards the received data blocks back up the I/O stack to the VM (operation 414). As such, cache module 110 receives the data blocks and copies the received data blocks to SSD device 106 (operation 416). If the VM's allocated cache space is full, for example, cache module 110 may invalidate or expire some older cached data to free up space for the newly received data. Returning to operation 404, if the VM does not have second-level caching enabled (e.g., has no second level caching policy or requirements), cache module 110 passes the read I/O request to array plugin 112 (or further down the I/O stack of the hypervisor), which forwards the request to shared disk array 102 (operation 410). Subsequently, array plugin 112 receives the data blocks from shared disk array 102 (operation 412), and forwards the received blocks back up the I/O stack to the VM (operation 414).

Figure 5:
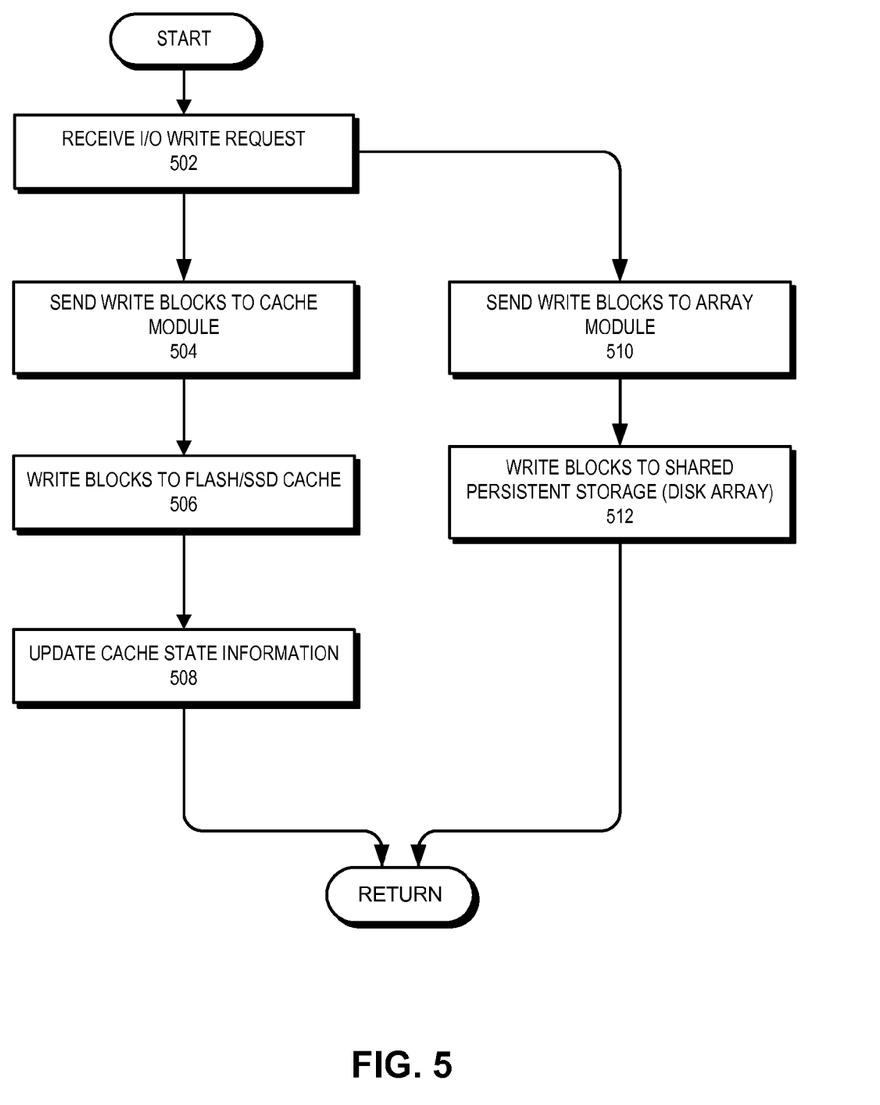
FIG. 5 presents a flowchart illustrating the process of processing a write I/O request in a host that supports VM-specific second-level caching, in accordance with one embodiment.

FIG. 5 presents a flowchart illustrating the process of processing a write I/O request in a host that supports VM-specific second-level caching, in accordance with one embodiment. During operation, the I/O stack of the hypervisor (e.g., MPIO framework 114 in one embodiment) receives a write I/O request originating VM that includes a number of data blocks that should be written to a virtual disk file, for example (operation 502). The I/O stack may then send the write I/O request to array plugin 112 or any other subsequent layer of the I/O stack to handle the write I/O request (operation 510). In response, array plugin 112 writes the data blocks in the write I/O request to shared disk array 102 (operation 512).

Simultaneously, the I/O stack may sends the write I/O request to cache module 110 (operation 504). Similar to a read I/O request as discussed above, cache module 110 is able to determine the unique identifier (UUID) of the VM issuing the write I/O request by obtaining the process ID (world ID) of the process issuing the write I/O request. Once cache module 110 identifies the UUID of the VM, it is able to writes the data blocks to a portion of SSD device 106 that it has allocated to the VM for caching purposes (operation 506). Cache module 110 updates the data block tables that it maintains to reflect that the data blocks of the write I/O request are now cached in SSD device 106, so that future read I/O requests for these data blocks from the same VM world ID would result in cache hits (operation 508).

Exemplary System

Figure 6:
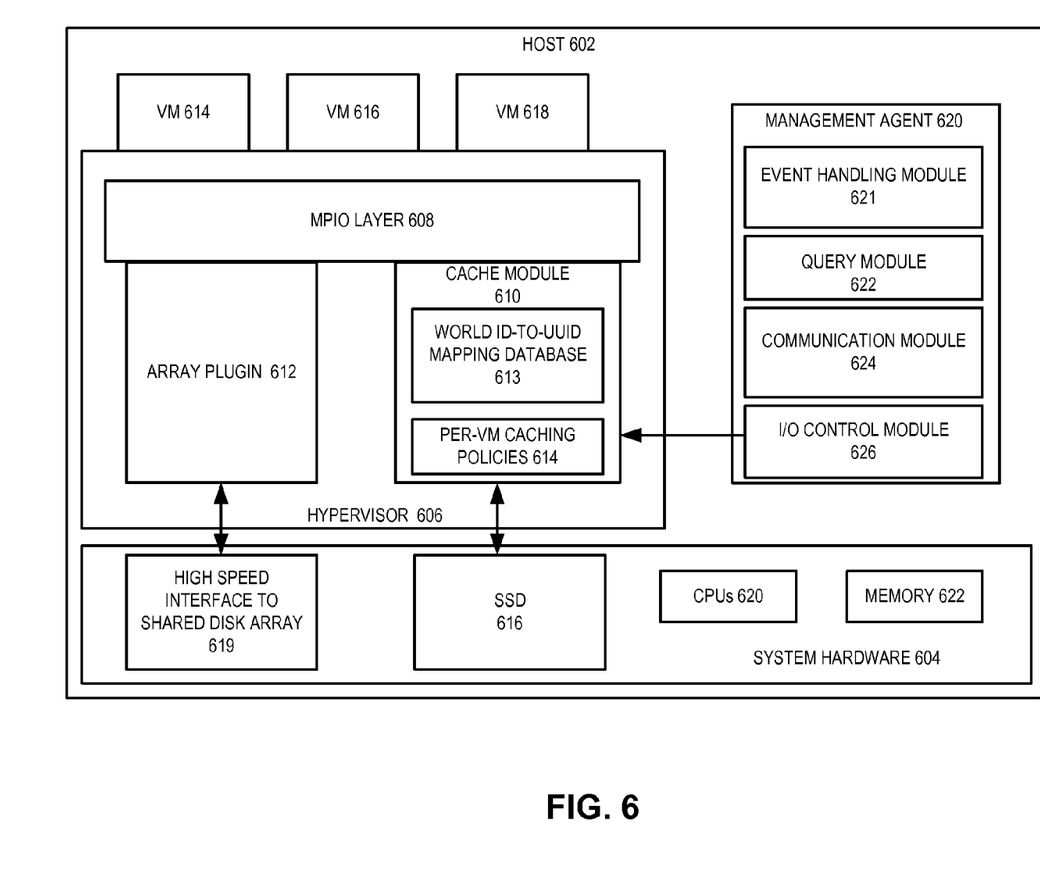
FIG. 6 illustrates an exemplary computer system that facilitates VM-granular I/O caching, in accordance with one embodiment.

FIG. 6 illustrates an exemplary computer system that facilitates VM-granular I/O caching, in accordance with one embodiment and as generally previously discussed. In the system illustrated in FIG. 6, a host 605 includes a set of system hardware 604, which includes a set of CPUs 620, memory 622, an SSD 616 serving as a second-level cache and a high speed interface 619 to a shared disk array. Host 602 also includes a hypervisor 606, which is responsible for starting, managing, and shutting down VMs. Hypervisor 606 manages a number of VMs 614, 616, and 618. Furthermore, in the embodiment of FIG. 6, hypervisor 606 includes an MPIO layer 608, which, as previously discussed couples to a cache plugin 610 (e.g., corresponding to cache module 110) and an array plugin 612. Cache plugin 610 includes a world ID-to-UUID mapping table or database 613 and a set of per-VM caching policies 614. Host 602 also includes a software management agent 620 running in the "user world," as previously discussed. Management agent 620 includes an event handling module 621, a query module 622, a communication module 624, and an I/O control module 626.

During operation, event handling module 621 monitors VM related events, such as power-on, shut-down and migrate. Upon a VM's power-on, event handling module 621 receives the corresponding power-on event and passes the VM's UUID to query module 622. Query module 622 in turn queries hypervisor 606 with the UUID and obtains all the world IDs for that VM. I/O control module 626 subsequently communicates the VM world ID-to-UUID mapping to cache plugin 610 (e.g., via IOCTL), which saves the mapping relationship in its world ID-to-UUID mapping database 613. In addition, communication module 624 in management agent 620 communicates with a global caching policy manager and obtains VM-specific caching policies that specify, for example, an amount of space in SSD 616 to allocate as a cache for a VM. Management agent 620 then communicates such policies to cache plugin 610 (e.g., via IOCTL). As a result, cache plugin 610 maintains the per-VM caching policies 614. Cache plugin 610 performs the I/O operations, such as the processes depicted in FIGS. 4 and 5.

In summary, embodiments of the present invention provide a system and method for facilitating VM-granular I/O caching. A host system includes a cache module as part of the I/O stack of a hypervisor, and a management agent running as a process, daemon or service. In one embodiment, such a management agent is run in "user world" such that it is unprivileged and accesses a kernel within the hypervisor. It should be noted, however, that alternative embodiments may utilize a management agent that is a process or service within the hypervisor or elsewhere. When a VM starts up or resumes (e.g., after a migration), the management agent obtains a mapping relationship between the VM's UUID and a number of PIDs or process IDs associated with the processes running in the host on behalf of the VM (e.g., sometimes referred to as vCPU IDs or world IDs). The management agent then passes this mapping information to the cache module, which then uses this mapping and the process ID associated with I/O requests to perform per-VM second-level caching in a locally attached SSD device. In addition, the management agent is in communication with a global caching policy manager and obtains caching policies on a per-VM basis. The cache plugin maintains and enforces this per-VM caching policy, for example, when a VM is migrated from one host to another (e.g., ensuring the new host has enough space in its locally attached SSD device to support the caching requirements of the VM).

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The foregoing descriptions of embodiments of the present invention have been presented only for purposes of illustration and description. They are not intended to be exhaustive or to limit this disclosure. Accordingly, many modifications and variations will be apparent to practitioners skilled in the art. For example, while certain functions have been described as taking place within a cache module or management agent, it should be recognized that any of these functions may be implemented in either of the cache module or the management agent in alternative embodiments and that even other embodiments may implement all the functions within one component or several other components. The scope of the present invention is defined by the appended claims.

What is claimed is:

1. A method for caching I/O data in a solid state drive (SSD) locally attached to a host computer supporting the running of a virtual machine (VM), the method comprising:
    allocating portions of the SSD to use as cache storage for VMs running on the host computer;
    maintaining, by a hypervisor of the host computer, a mapping relationship between unique identifiers for VMs running on the host computer and one or more process identifiers (PIDs) associated with processes running in the host computer that correspond to each of the VM's execution on the host computer;
    integrating a cache module into an I/O stack of the hypervisor to allow the cache module to intercept I/O requests before the I/O requests are forwarded to a virtual disk file;
    receiving, by the hypervisor, an I/O request from the VM, wherein the VM directed the I/O request for the virtual disk file of the VM that is remotely stored from the host computer;
    intercepting, by the cache module in the hypervisor, the I/O request from the I/O stack of the hypervisor before the I/O request is sent to the virtual disk file;
    determining, by the cache module in the hypervisor, a PID associated with I/O request prior to accessing the mapping relationship;
    using, by the cache module in the hypervisor, the determined PID to look up and extract a unique identifier for the VM that corresponds to the determined PID from the mapping relationship; and
    accessing, by the cache module in the hypervisor, a portion of the SSD corresponding to the unique identifier of the VM that is used as a cache for the VM in order to handle the I/O request.

2. The method of claim 1, further comprising
    receiving a request to allocate an amount of the SSD as the cache for the VM upon a request to start-up the VM on the host computer; and
    determining whether the SSD can support the requested allocation.

3. The method of claim 2, wherein the amount of SSD to allocate as the cache for the VM is maintained as a per-VM caching policy at a remote server configured to provide caching policies to requesting host computers.

4. The method of claim 1, wherein the PID corresponds to a process associated with a virtual CPU (vCPU) of the VM that is issuing the I/O request.

5. The method of claim 1, performed within a layer of an I/O stack of the hypervisor supporting execution of VMs on the host computer and further comprising receiving associations of the unique identifiers for VMs with the PIDs associated with processes that respectively correspond to the VMs from a management agent component in the host computer that is configured to receive notifications from the hypervisor upon the startup of VMs on the host computer.

6. The method of claim 1, further comprising invalidating the portion of the SSD corresponding to the unique identifier of the VM when the VM is shut-down or migrated to a different host computer.

7. The method of claim 1, wherein the cache for the VM is a write-though cache.

8. The method of claim 1, wherein:
    the process ID is passed through one or more layers of an I/O stack of the hypervisor along with the I/O request, and
    the process ID is extracted from data structures that accompany the I/O request though the set of layers of the I/O stack.

9. A non-transitory computer readable storage medium storing instructions which when executed by a host computer cause the host computer to perform a method for caching I/O data in a solid state drive (SSD) locally attached to the host computer supporting the running of a virtual machine (VM), the method comprising:
    allocating portions of the SSD to use as cache storage for VMs running on the host computer;
    maintaining, by a hypervisor of the host computer, a mapping relationship between unique identifiers for VMs running on the host computer and one or more process identifiers (PIDs) associated with processes running in the host computer that correspond to each of the VM's execution on the host computer;
    integrating a cache module into an I/O stack of the hypervisor to allow the cache module to intercept I/O requests before the I/O requests are forwarded to a virtual disk file;
    receiving, by the hypervisor, an I/O request from the VM, wherein the VM directed the I/O request for the virtual disk file of the VM that is remotely stored from the host computer;
    intercepting, by the cache module in the hypervisor, the I/O request from the I/O stack of the hypervisor before the I/O request is sent to the virtual disk file;
    determining, by the cache module in the hypervisor, a PID associated with I/O request prior to accessing the mapping relationship;
    using, by the cache module in the hypervisor, the determined PID to look up and extract a unique identifier for the VM that corresponds to the determined PID from the mapping relationship; and
    accessing, by the cache module in the hypervisor, a portion of the SSD corresponding to the unique identifier of the VM that is used as a cache for the VM in order to handle the I/O request.

10. The non-transitory computer readable storage medium claim 9, wherein the method further comprises
    receiving a request to allocate an amount of the SSD as the cache for the VM upon a request to start-up the VM on the host computer; and
    determining whether the SSD can support the requested allocation.

11. The non-transitory computer readable storage medium claim 10, wherein the amount of SSD to allocate as the cache for the VM is maintained as a per-VM caching policy at a remote server configured to provide caching policies to requesting host computers.

12. The non-transitory computer readable storage medium claim 9, wherein the PID corresponds to a process associated with a virtual CPU (vCPU) of the VM that is issuing the I/O request.

13. The non-transitory computer readable storage medium claim 9, wherein the method is performed within a layer of an I/O stack of the hypervisor supporting execution of VMs on the host computer and further comprising receiving associations of the unique identifiers for VMs with the PIDs associated with processes that respectively correspond to the VMs from a management agent component in the host computer that is configured to receive notifications from the hypervisor upon the startup of VMs on the host computer.

14. The non-transitory computer readable storage medium claim 9, wherein the method further comprises invalidating the portion of the SSD corresponding to the unique identifier of the VM when the VM is shut-down or migrated to a different host computer.

15. The non-transitory computer readable storage medium claim 9, wherein the cache for the VM is a write-though cache.

16. A host computer system configured to cache I/O data, the host computer comprising:
   a solid state drive (SSD); and
   a processor configured to perform the steps of:
      allocating portions of the SSD to use as cache storage for VMs running on the host computer;
      maintaining, by a hypervisor of the host computer, a mapping relationship between unique identifiers for VMs running on the host computer and one or more process identifiers (PIDs) associated with processes running in the host computer that correspond to each of the VM's execution on the host computer;
      integrating a cache module into an I/O stack of the hypervisor to allow the cache module to intercept I/O requests before the I/O requests are forwarded to a virtual disk file;
      receiving, by the hypervisor, an I/O request from the VM, wherein the VM directed the I/O request for the virtual disk file of the VM that is remotely stored from the host computer;
      intercepting, by the cache module in the hypervisor, the I/O request from the I/O stack of the hypervisor before the I/O request is sent to the virtual disk file;
      determining, by the cache module in the hypervisor, a PID associated with I/O request prior to accessing the mapping relationship;
      using, by the cache module in the hypervisor, the determined PID to look up and extract a unique identifier for the VM that corresponds to the determined PID from the mapping relationship; and
      accessing, by the cache module in the hypervisor, a portion of the SSD corresponding to the unique identifier of the VM that is used as a cache for the VM in order to handle the I/O request.

17. The host computer system of claim 16, wherein processor is further configured to perform the steps of:
   receiving a request to allocate an amount of the SSD as the cache for the VM upon a request to start-up the VM on the host computer; and
   determining whether the SSD can support the requested allocation.

18. The host computer system of claim 17, wherein the amount of SSD to allocate as the cache for the VM is maintained as a per-VM caching policy at a remote server configured to provide caching policies to requesting host computers.

19. The host computer system of claim 16, wherein the PID corresponds to a process associated with a virtual CPU (vCPU) of the VM that is issuing the I/O request.

20. The host computer system of claim 16, wherein the steps performed by the processor are performed within a layer of an I/O stack of the hypervisor supporting execution of VMs on the host computer and wherein the processor is further configured to receive associations of the unique identifiers for VMs with the PIDs associated with processes that respectively correspond to the VMs from a management agent component in the host computer that is configured to receive notifications from the hypervisor upon the startup of VMs on the host computer.

21. The host computer of claim 16, wherein the method further comprises invalidating the portion of the SSD corresponding to the unique identifier of the VM when the VM is shut-down or migrated to a different host computer.

* * * * *